United States Patent
Lee

(10) Patent No.: US 8,984,208 B2
(45) Date of Patent: Mar. 17, 2015

(54) METHOD AND APPARATUS FOR I/O SCHEDULING IN DATA STORAGE DEVICE

(75) Inventor: Kyoung Back Lee, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 374 days.

(21) Appl. No.: 13/368,365

(22) Filed: Feb. 8, 2012

(65) Prior Publication Data

US 2012/0278537 A1 Nov. 1, 2012

(30) Foreign Application Priority Data

Apr. 26, 2011 (KR) .................. 10-2011-0038965

(51) Int. Cl.
*G06F 12/00* (2006.01)
*G06F 3/06* (2006.01)

(52) U.S. Cl.
CPC .............. *G06F 3/061* (2013.01); *G06F 3/0659* (2013.01); *G06F 3/0679* (2013.01)
USPC .................. 711/103; 711/154; 710/6; 710/36

(58) Field of Classification Search
USPC .................. 711/103, 154; 710/6, 36
See application file for complete search history.

(56) References Cited

U.S. PATENT DOCUMENTS

| | | | |
|---|---|---|---|
| 6,857,052 B2 * | 2/2005 | Amano | 711/154 |
| 8,458,381 B2 * | 6/2013 | Holty et al. | 710/52 |
| 2009/0265507 A1 | 10/2009 | Jibbe et al. | |
| 2010/0287333 A1 * | 11/2010 | Lee et al. | 711/103 |

FOREIGN PATENT DOCUMENTS

| | | |
|---|---|---|
| JP | 2000-339225 | 12/2000 |
| KR | 1020030054109 A | 7/2003 |
| KR | 1020050107570 A | 11/2005 |

\* cited by examiner

*Primary Examiner* — Matthew Bradley
(74) *Attorney, Agent, or Firm* — Volentine & Whitt, PLLC

(57) ABSTRACT

An input/output (I/O) scheduling device comprises a plurality of trans-descriptor operators each corresponding to one of a plurality of hosts and configured to sustain a trans-descriptor and transmit the trans-descriptor to a hardware module, a transmitting scheduler configured to schedule transmission of trans-descriptors through communication with the plurality of trans-descriptor operators, and a receiving scheduler configured to schedule reception of trans-descriptors through communication with the trans-descriptor operators.

19 Claims, 8 Drawing Sheets

METHOD AND APPARATUS FOR I/O SCHEDULING IN DATA STORAGE DEVICE

CROSS-REFERENCE TO RELATED APPLICATIONS

This application claims priority under 35 USC §119 to Korean Patent Application No. 10-2011-0038965 filed on Apr. 26, 2011, the subject matter of which is hereby incorporated by reference.

BACKGROUND OF THE INVENTION

The inventive concept relates generally to electronic data storage technologies. More particularly, the inventive concept relates to data storage devices connected to multiple hosts, and input/output (I/O) scheduling devices and methods that can be used to schedule I/O operations for the hosts.

Storage devices such as hard disk drives (HDDs) and solid-state disk (SSDs) are widely used to store various types of data in computer systems, portable electronic devices, and other electronic environments. In some environments, a storage device may be used to store data for multiple host devices, such as multiple processors, multiple network endpoints, or multiple client devices connected to a server.

In environments where multiple host devices access a storage device, an I/O scheduling device can be used to coordinate I/O operations among the multiple hosts. The I/O scheduling device can control various aspects of memory access operations performed on the storage device, such as the access priority of each host, the latency of the operations, and many others. Consequently, the I/O scheduling device can have a significant impact on the performance of both the storage device and the hosts.

SUMMARY OF THE INVENTION

In one embodiment of the inventive concept, an I/O scheduling device comprises a plurality of trans-descriptor operators each corresponding to one of a plurality of hosts and configured to sustain a trans-descriptor and transmit the trans-descriptor to a hardware module, a transmitting scheduler configured to schedule transmission of trans-descriptors through communication with the plurality of trans-descriptor operators, and a receiving scheduler configured to schedule reception of trans-descriptors through communication with the trans-descriptor operators.

In another embodiment of the inventive concept, an I/O scheduling method for a storage device in a multi-host environment comprises defining a plurality of trans-descriptor operators according to a number of hosts connected to the storage device, each of the trans-descriptor operators configured to sustain a trans-descriptor and transmit the trans-descriptor to a hardware module, scheduling transmission of a trans-descriptor in communication with a trans-descriptor operator corresponding to a host generating a transmitting command, and scheduling reception of a trans-descriptor in communication with a trans-descriptor operator corresponding to a host generating a receiving command independent of the transmitting scheduler.

In still another embodiment of the inventive concept, a system comprises a storage device comprising one or more memory devices, a plurality of hosts configured to store data in the storage device, and an I/O scheduling device configured to schedule transfer of trans-descriptors between the storage device and the plurality of hosts, wherein the I/O scheduling device comprises a transmitting scheduler and a receiving schedule that operate simultaneously to a transmit trans-descriptor from a trans-descriptor operator, and to receive a trans-descriptor in a trans-descriptor operator.

These and other embodiments of the inventive concept can potentially improve the performance of a storage device by allowing full duplex scheduling of access operations through the use of parallel trans-descriptor pathways.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

The terms used in this specification are intended to describe particular embodiments and are not to limit the scope of the inventive concept. As used herein, terms in singular form also encompass the plural form unless the context indicates otherwise. Also, terms such as "comprise," "comprising," "include," and "including," indicate the presence of certain features, but they do not preclude additional features.

Figure 1:
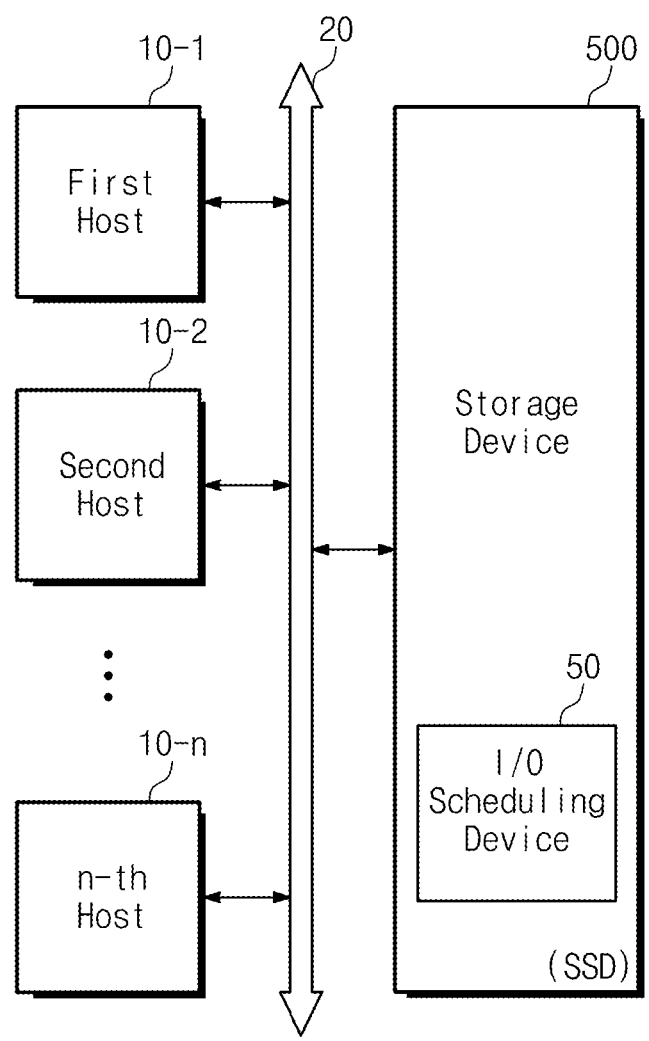
FIG. 1 is a diagram of an electronic system comprising a storage device and multiple hosts according to an embodiment of the inventive concept.

FIG. 1 is a diagram of an electronic system comprising a storage device and multiple hosts according to an embodiment of the inventive concept.

Referring to FIG. 1, the system comprises a storage device 500 and hosts 10-1 through 10-n, which are connected to each other via a system bus 20. Storage device 500 comprises an I/O scheduling device 50, which is used to schedule I/O operations of hosts 10-1 through 10-n. For example, I/O scheduling device 50 can be used to schedule memory access operations requested by hosts 10-1 through 10-n.

Storage device 500 can be, for example, an SSD or an HDD. The SSD can potentially input and output data at a higher speed than the HDD, and it can have lower mechanical delays and failure rate than the HDD.

The SSD is typically one of two types. A first type of SSD uses a nonvolatile memory for data storage. Such an SSD can readily replace a hard disk drive. A second type of SSD uses a high-speed volatile memory such as a dynamic random access memory (DRAM) as a working memory. This type of SSD has a relatively higher data access time and is mainly used to enhance speed of an application delayed by the latency of a disk drive. However, because it uses a volatile memory, it may further comprise an internal battery to provide power for a backup operation in the event that power is unexpectedly loss. In the backup memory, data stored in the volatile memory can be transferred to a nonvolatile memory for long term storage. Then, after power is recovered, the data can be re-copied to the DRAM from the backup disk to allow the SSD to resume normal operation. These devices are especially useful in computer systems using large amounts of RAM.

Figure 2:
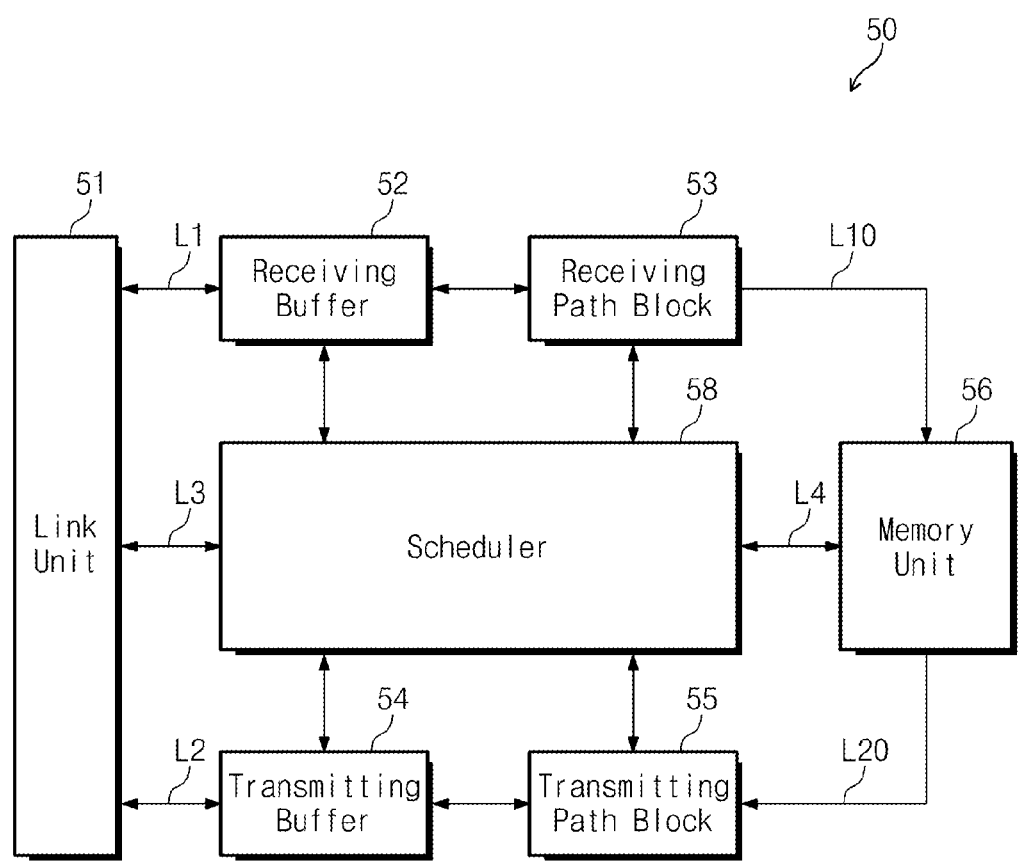
FIG. 2 is a block diagram of an I/O scheduling device in the storage device of FIG. 1 according to an embodiment of the inventive concept.

FIG. 2 is a block diagram of I/O scheduling device 50 according to an embodiment of the inventive concept.

Referring to FIG. 2, I/O scheduling device 50 comprises a link unit 51, a receiving buffer 52, a receiving path block 53, a transmitting buffer 54, a transmitting path block 55, a memory unit 56, and a scheduler 58.

Link unit 51 is connected to multiple hosts through system bus 20. It is further connected to receiving buffer 52 through a line L1, to transmitting buffer 54 through a line L2, and to scheduler 58 through a line L3. The connection between link unit 51 and scheduler 58 allows scheduler 58 to receive information for scheduling I/O operations of hosts 10-1 through 10-n.

Collectively, unit 51, receiving buffer 52 and transmitting buffer 54 can be referred to as a hardware module for performing memory access operations on storage device 500. In this hardware module, link unit 51 controls a connection with each host, receiving buffer 52 temporarily stores received I/O data, and transmitting buffer 54 temporarily stores I/O data to be transmitted to a host.

Scheduler 58 can communicate with the hardware module using transaction descriptors, also referred to as "trans-descriptors". A trans-descriptor (TD) is a mechanism, such as a data structure, that a system can use to communicate information for a particular data transaction. For instance, in a server based system, a trans-descriptor can be used to convey transaction information between a requester and a completer of the transaction.

In some embodiments, a trans-descriptor comprises an executable portion or a pointer to an executable portion. The executable portion can be executed by the hardware module to carry out a data access operation on storage device 500. Accordingly, the executable portion can be referred to as a hardware trans-descriptor (H/W TD). The trans-descriptor further comprises one or more pointers that can be used to organize multiple trans-descriptors into a larger data structure such as a linked list for scheduling multiple successive transactions.

In some embodiments, a H/W TD is stored in a working memory such as a static random access memory (SRAM) or dynamic random access memory (DRAM), and the stored H/W TD is accessed via a pointer in a corresponding trans-descriptor.

Scheduler 58 uses a scheduling algorithm to select hardware information for communicating between hosts 10-1 through 10-n and storage device 500, and it transmits the selected hardware information to the hardware module using a trans-descriptor. For example, scheduler 58 may select hardware corresponding to one of hosts 10-1 through 10n based on a round robin scheduling algorithm, and then retrieve a trans-descriptor from a data structure corresponding to the selected hardware. This data structure can include, for instance, a linked list or queue of multiple trans-descriptors that is managed by scheduler 58.

Memory unit 56 receives I/O data from receiving path block 53 through a line L10 and stores the received I/O data in an internal memory region. Memory unit 56 also outputs the I/O data stored in the internal memory region to transmitting path block 55 through a line L20. Scheduler 58 controls the memory unit 56 through a line L4.

Figure 3:
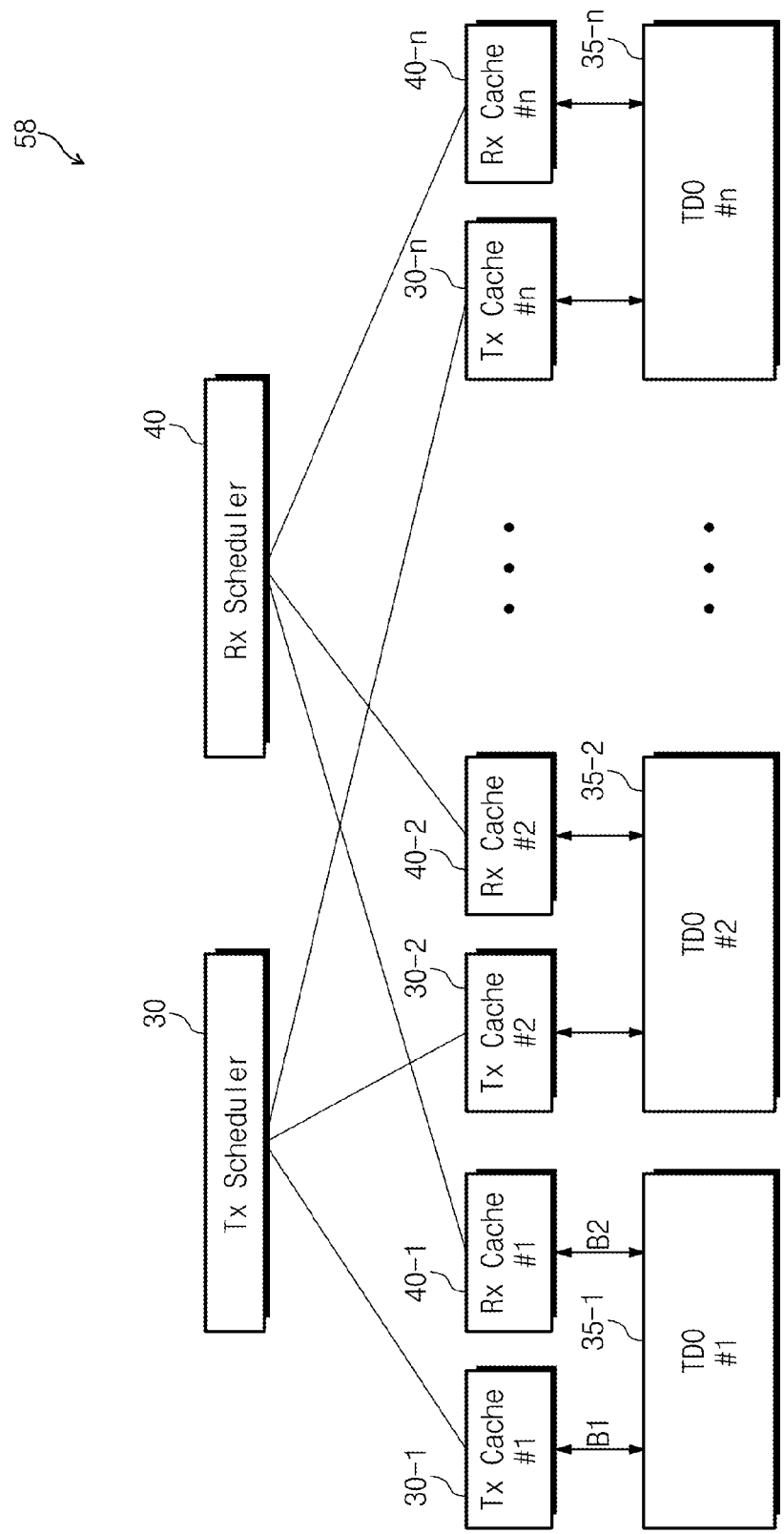
FIG. 3 is a block diagram of a scheduler shown in FIG. 2 according to an embodiment of the inventive concept.

FIG. 3 is a block diagram of scheduler 58 according to an embodiment of the inventive concept.

Referring to FIG. 3, scheduler 58 comprises a transmitting scheduler 30, a receiving scheduler 40, and a plurality of trans-descriptor operators 35-1 through 35-n, which are referred to collectively as trans-descriptor operators 35.

A trans-descriptor operator is an entity that performs operations on trans-descriptors. For example, trans-descriptor operators 35 maintain and dispatch trans-descriptors according to a scheduling algorithm of scheduler 58. Moreover, each of trans-descriptor operators 35 typically corresponds to one of hosts 10-1 through 10-n, so each one maintains and dispatches trans-descriptors for a single one of the hosts. Within each trans-descriptor operator, the trans-descriptors are typically maintained in a data structure such as a linked list, a queue, or one of various standard data structures. They are dispatched in an order influenced by their arrangement within the data structure, in combination with the scheduling algorithm of scheduler 58.

Scheduler 58 further comprises transmission dispatching caches 30-1 through 30-n located between the trans-descriptor operators 35 and transmitting scheduler 30. These caches temporarily store trans-descriptors to be transmitted to trans-descriptor operators 35. Similarly, scheduler 58 comprises reception dispatching caches 40-1 through 40-n between the trans-descriptor operator 35 and receiving scheduler 40. These caches temporarily store trans-descriptors received from trans-descriptor operators 35.

Transmitting scheduler 30 communicates with trans-descriptor operators 35 to schedule transmission of trans-descriptors to the hardware module. For example, transmitting scheduler 30 can schedule transmission to active hosts in a round robin fashion. Similarly, receiving scheduler 40 communicates with trans-descriptor operator 35 to schedule reception of trans-descriptors.

The use of independent transmitting and receiving schedulers allows full duplex communication with trans-descriptor operators 35. For example, while trans-descriptor operator (TDO) 35-1 for a first host communicates with transmitting scheduler 30, a TDO 35-2 for a second host can communicate with receiving scheduler 40.

Figure 4:
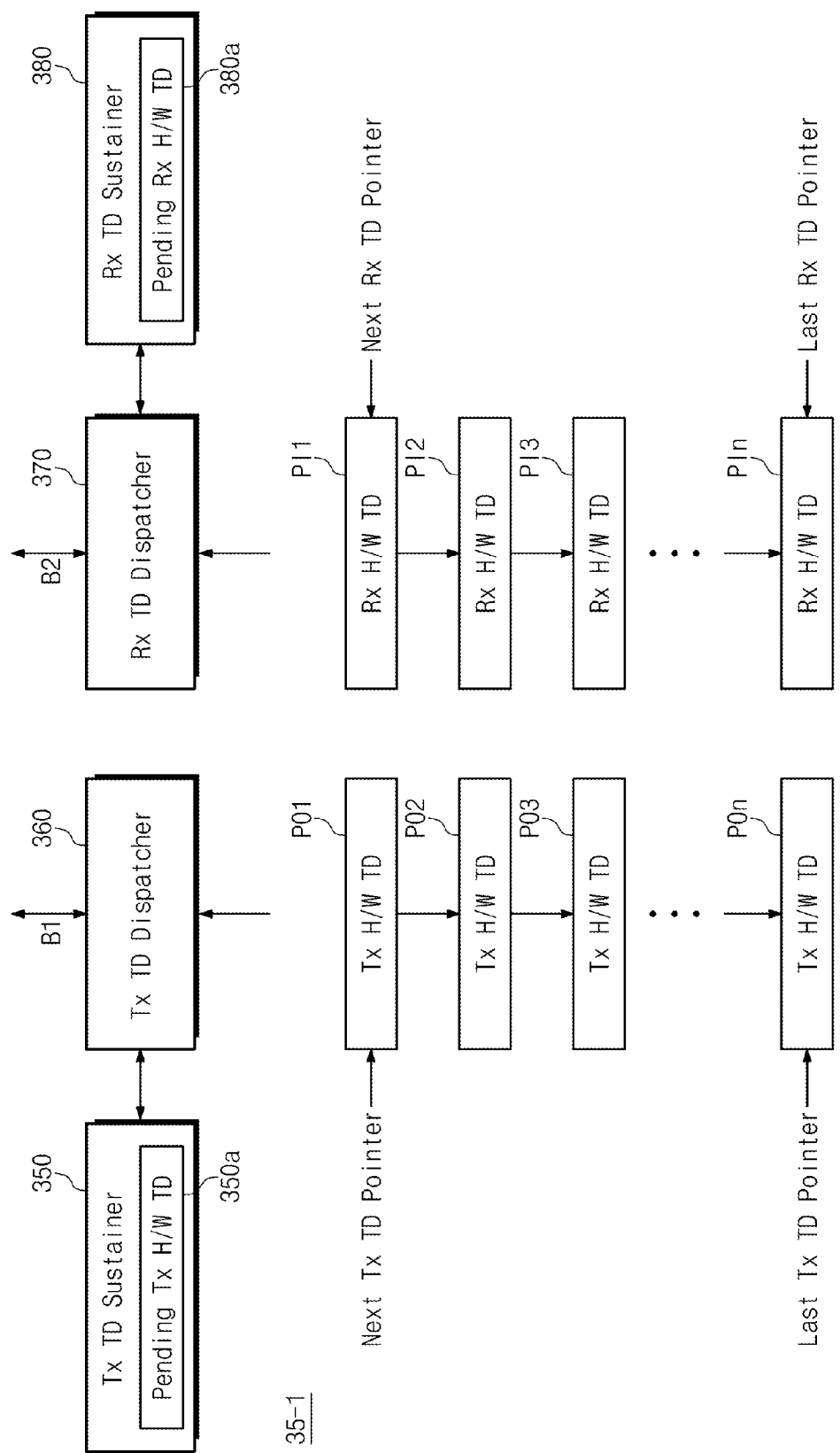
FIG. 4 is a block diagram of a transaction descriptor operator shown in FIG. 3 according to an embodiment of the inventive concept.

FIG. 4 is a block diagram of trans-descriptor operator 35-1 shown in FIG. 3 according to an embodiment of the inventive concept.

Referring to FIG. 4, trans-descriptor operator 35-1 comprises a transmitting sustainer 350, a transmitting dispatcher 360, a receiving sustainer 380, and a receiving dispatcher 370. Sustainer 350 is connected to transmitting scheduler 30 and configured to sustain (i.e., store) a trans-descriptor. Dispatcher 360 is connected to transmitting scheduler 30 through a bus line B1 and configured to transmit the trans-descriptor. Trans-descriptor operation 35-1 further comprises a sustainer 380 connected to receiving scheduler 40 and configured to sustain a trans-descriptor, and a dispatcher 370 connected to receiving scheduler 40 through a bus line B2 and configured to transmit the trans-descriptor.

Figure 5:
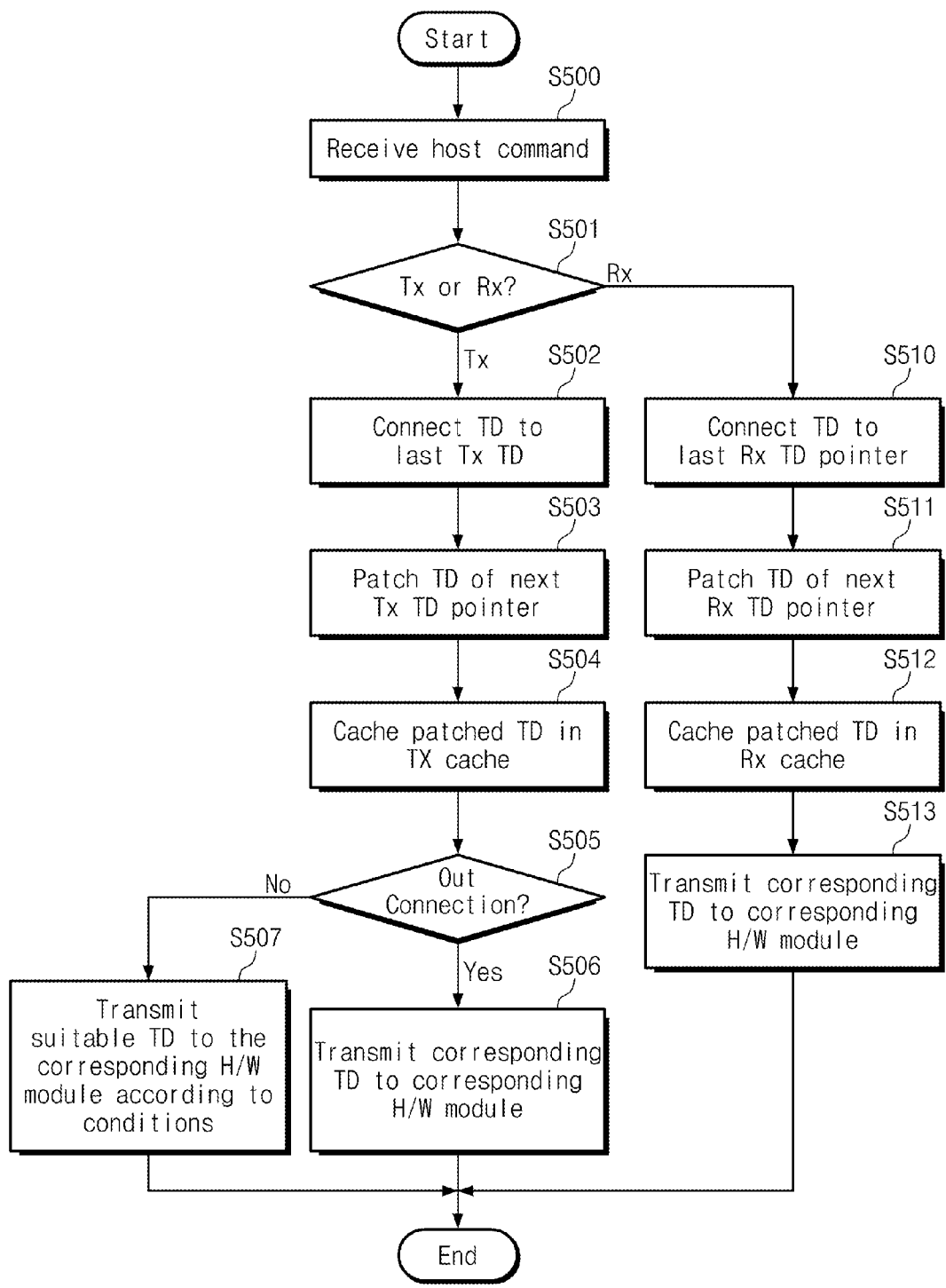
FIG. 5 is a flowchart of an I/O scheduling operation performed by the scheduler of FIG. 3 according to an embodiment of the inventive concept.

Sustainers 350 and 380 store data 350a and 380a, respectively. As illustrated at the bottom of FIG. 4, data 350a and 380a is stored in two linked data structures. Each of the linked data structures comprises a sequence of pointers to H/W TDs. In particular, data 350*a* comprises pointers to transmitting H/W TDs, and data 380*a* comprises pointers to receiving H/W TDs. The H/W TDs pointed to by data 350*a* and 380*a* can be stored in an SRAM or DRAM, for example. Each data structure also includes a "Next Tx/Rx TD pointer" and a "Last Tx or Rx TD pointer", which indicate the beginning and end of the data structure. As illustrated in FIG. 5, these pointers can be used to modify the data structure to incorporate a new trans-descriptor when I/O scheduling device 50 receives a new command from one of hosts 10-1 through 10-*n*.

Dispatchers 360 and 370 transmit and receive trans-descriptors to/from transmitting and reception dispatching caches 30-1 through 30-*n* and 40-1 through 40-*n*. The order of their transmission depends on the order of data 350*a* and 380*a*. For example, a transmitting H/W TD disposed at a pointer PO1 is first transmitted, followed by a transmitting H/W TD disposed at a pointer PO2, and so on. Similarly, a receiving H/W TD disposed at a pointer PI1 is first transmitted, followed by a transmitting H/W TD disposed at a pointer PI2, and so on. Each H/W TD is typically executed by a corresponding H/W module that is pointed to by a corresponding trans-descriptor. The pointer to the H/W module is typically set by firmware.

Each of trans-descriptor operators 35 corresponds to one of hosts 10-1 through 10-*n*, and these trans-descriptor operators communicate with transmitting and receiving schedulers 30 and 40 in a full duplex fashion. In addition to transferring trans-descriptors and related data, transmitting and receiving schedulers 30 and 40 can also transfer size information of I/O data to be executed by each host.

As described above, trans-descriptor operators are divided, and a TD sustainer and a TD dispatcher are prepared to perform transmitting and receiving operations at the same time. These and related components can optionally process host-mixed I/O, achieve continuous transmission without connection-disconnection with respect to multiple operations between the same hosts, prevent I/O service starvation of a specific host, and automatically transmit pending I/O.

In some embodiment, hardware trans-descriptors are stored in a specific memory, such as an SRAM or DRAM, and they are generated by firmware based on a type of service requested by a host. Thus, a trans-descriptor is automatically transmitted to a corresponding hardware block by a trans-descriptor operator when a TD pointer is set.

In view of the above, a sequence for host transmission under normal circumstances may adopt round-robin scheduling. That is, a scheduler can transmit hardware trans-descriptors for active trans-descriptor operators to each H/W module in a round-robin fashion. Accordingly, scheduling of an equivalent level can be provided to respective hosts to minimize response time for the respective hosts.

Where an out connection occurs to a specific host, scheduler 58 recognizes the out connection through the link unit 51. A transmitting scheduler receives an executable trans-descriptor of a corresponding host in a dispatching cache and transmits the received TD to a corresponding hardware module taking charge of Tx transmission, which allows utilization of a host bus to be improved.

Continuous I/O service provided by a specific host may be carried out as follows. If the hardware trans-descriptor is sufficient at each host, a trans-descriptor operator continues to transmit a TD to each dispatching cache and a scheduler continues to transmit a TD such that the TD transmitting is maintained without disconnection. Thus, overhead caused by opening and closing is removed to enhance read performance.

In some embodiments, prior processing of pending I/O may be done as follows. The content of pending I/O at each host is transferred to a TD sustainer in a TDO. If there is certain content in the sustainer during an out-connection or in-connection state, it is a prior service target. As a result, the pending I/O may be automatically transmitted without intervention of firmware.

Under an error situation or a specific situation in which it is necessary to change the priority of an operation, firmware may request priority to a dispatcher of a TDO at each host. If a TD of the priority is first executed by the dispatcher, rapid response may be provided during occurrence of the error or specific situation.

In some embodiments, an optional I/O selection function is performed for each host. Firmware provides the priority of service of hosts to an I/O scheduling device. Where priority processing is completed, the I/O scheduling device can return to round-robin scheduling.

In some embodiments, an automatic hardware operation may be performed little or no intervention of firmware. Moreover, a full duplex environment can be used to improve performance, especially read performance in a multi-host environment.

FIG. 5 is a flowchart of an I/O scheduling operation performed by the scheduler of FIG. 3 according to an embodiment of the inventive concept.

Referring to FIG. 5, scheduler 58 receives a host command transmitted from any host through link unit 51 (S500). Next, the method determines whether the received host command is a transmitting command or a receiving command (S501). If the received host command is the transmitting command (S501=Tx), the method proceeds to step S502.

Next, a trans-descriptor is connected to a last transmitting TD pointer (S502). For example, this can be accomplished by setting a transmitting hardware TD to a pointer Pon in FIG. 4. Then, a TD of the next transmitting TD pointer is patched (S503). For example, this can be accomplished by patching the transmitting hardware TD to a pointer Po1 in FIG. 4. Thereafter, the patched TD is cached to a receiving cache (S504). For example, a TD patched by the dispatcher 360 in FIG. 4 can be provided to a receiving cache 30-1 through a bus line B1. Next, the method determines whether there is an open out-connection to a host (S505). If there is an out-connection (S505=Yes), a corresponding TD is transmitted to a corresponding hardware module (S506). This can be accomplished, for example, by transmitting scheduler 30 in FIG. 3. Otherwise, if there is no out-connection (S505=No), an operation is performed to transmit a suitable TD to a corresponding hardware module according to various conditions. These conditions may include, for example, round-robin scheduling or selection based on a transmission rate at each host.

Where the received host command is the receiving command (S501=Rx), a TD is connected to the last receiving pointer (S510). This can be accomplished, for example, by setting a receiving hardware TD to the pointer Pin in FIG. 4. Next, a TD of the next receiving TD pointer is patched (S511). This can be accomplished, for example, by patching the receiving hardware TD to a pointer Pi1 in FIG. 4.

Thereafter, the patched TD is cached to a receiving cache (S512). For example, a TD patched by dispatcher 370 in FIG. 4 can be provided to a receiving cache 40-1 through a bus line B2. Then, a corresponding TD is transmitted to a corresponding hardware module by receiving scheduler 40 (S513).

In a multi-host supporting device such as serial attached Small Computer System Interface (SCSI) (SAS), maximization of performance is important. Full duplex operation between command/data, command/response, and data/data must be supported to efficiently process I/O at each host. In some embodiments, I/O service of multiple hosts can be improved by performing I/O scheduling using the operations illustrated in FIG. 5.

Figure 6:
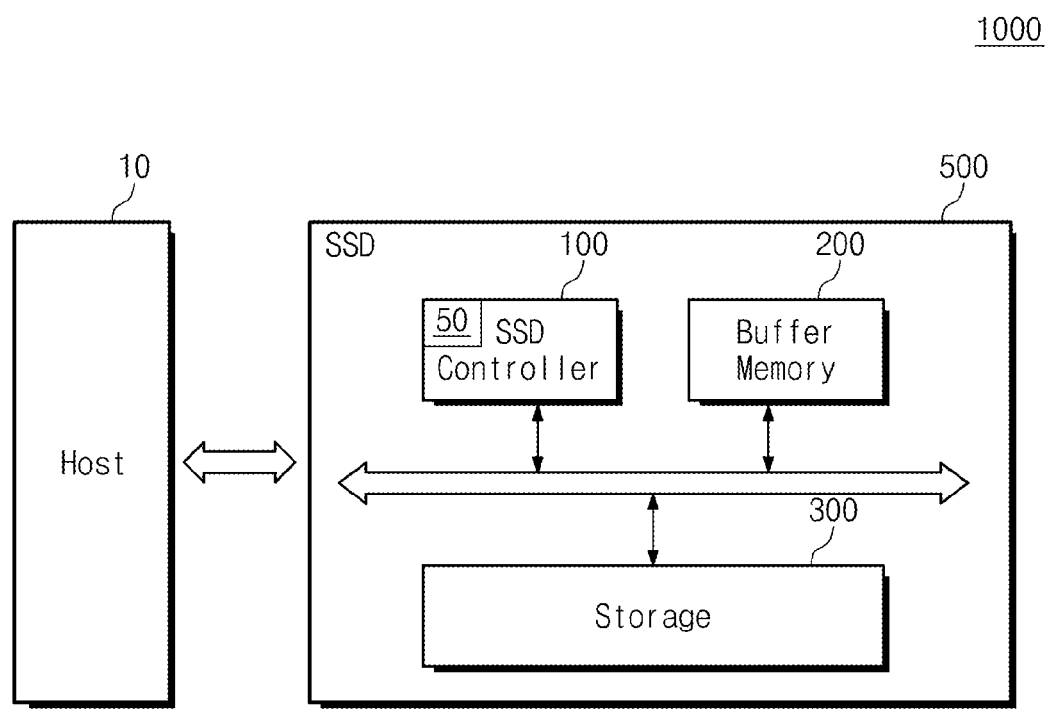
FIG. 6 is a block diagram of a system incorporating an I/O scheduling device according to an embodiment of the inventive concept.

FIG. 6 is a block diagram of a data processing system 1000 incorporating an I/O scheduling device according to an embodiment of the inventive concept.

Referring to FIG. 6 data processing system 1000 comprises a host 10 and storage device 500 in the form of an SSD. Storage device 500 comprises an SSD controller 100, a buffer memory 200, and storage 300. In alternative embodiments, storage device 500 can take other forms, such as an HDD, a memory card, or a memory card system.

Buffer memory 200 temporarily stores data transmitted/received between SSD controller 100 and storage 300 and data transmitted/received between the SSD controller 100 and host 10. A buffer memory control function is provided in SSD controller 100 to control data input/output of buffer memory 200. This means that data input/output operations of buffer memory 200 are performed through SSD controller 100. Buffer memory 200 is disposed outside SSD controller 100, as shown in FIG. 6, or inside the SSD controller 100. Buffer memory 200 comprises a random access memory such as a DRAM or an SRAM.

Storage 300 serves as main storage of storage device 500. Unlike a platter of a HDD, storage 300 comprises a plurality of semiconductor memory chip to store data. For example, storage 300 may comprise a nonvolatile memory and/or a volatile memory. A plurality of channels (e.g., N channels) can be provided between the SSD controller 100 and storage 300. Each of the channels can be a multi-way channel, e.g., an M-way channel.

Storage 300 is not limited to specific kinds and specific types, and it can include carious alternative types of memories. For example, storage 300 can include flash memories or nonvolatile memories such as magnetoresistive random access memory (MRAM) and phase change random access memory (PRAM). Alternatively, storage 300 may include a combination of at least one nonvolatile memory and at least one of volatile memory or a combination of at least two types of nonvolatile memories.

In addition, storage 300 can include memory cells that store different numbers of bits. For example, a flash memory can include single-level flash memory cells or multi-level flash memory cells. Moreover, the memory cells can be organized in different architectures. For instance, in a flash memory, they may be arranged in a NAND flash memory configuration, a NOR flash memory configuration, or a fusion flash memory configuration comprising a flash memory core and memory control logic in a single chip. Flash memories can be configured in a hybrid-type configuration in which at least two types of flash memories are combined. Additionally, the structure of charge storage layers of memory cells in flash memories may be configured in various forms. For example, a charge storage layer of a memory cell may be made of a conductive layer such as polycrystalline silicon or a dielectric material such as $Si_3N_4$, $Al_2O_3$, $HfA_{10}$, and HfSiO. A flash memory structure using a dielectric layer such as $Si_3N_4$, $Al_2O_3$, $HfA_{10}$ and HfSiO as a charge storage layer may be referred to as a charge trap flash (CTF) memory.

SSD controller 100 controls operations for writing/reading data to/from buffer memory 200 and storage 300 in response to a command input from host 10. SSD controller 100 controls overall operations of an SSD and comprises I/O scheduling device 50. Accordingly, as other hosts are provided in addition to host 10, the SSD controller 100 can use I/O scheduling device 50 to process I/O requests from the multiple hosts. SSD controller 100 also controls operations of writing/reading data to/from buffer memory 200.

As described above, input/output data of each host can be scheduled without substantial degradation in performance under a system environment of a multi-host including a plurality of hosts by performing the operation of the SSD controller 100 including I/O scheduling device 50.

Figure 7:
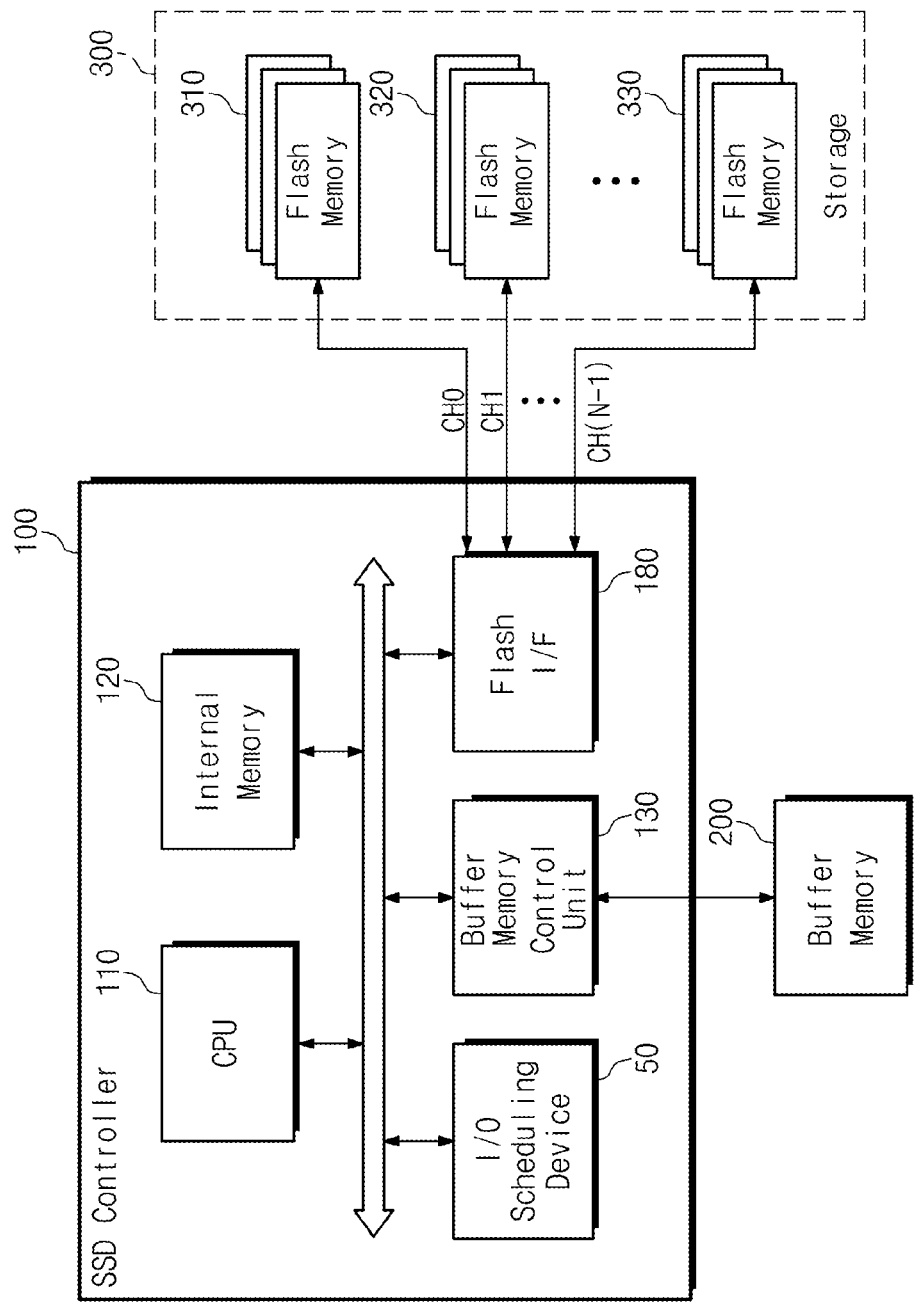
FIG. 7 is a block diagram of an SSD controller in the system of FIG. 6 according to an embodiment of the inventive concept.

FIG. 7 is a block diagram of SSD controller 100 shown in FIG. 6 according to an embodiment of the inventive concept.

Referring to FIG. 7, SSD controller 100 comprises a central processing unit (CPU) 110, an internal memory 120, a buffer memory control unit 130, I/O scheduling device 50, and a flash interface (Flash I/F) 180. CPU 110, internal memory 120, buffer memory control unit 130, I/O scheduling device 50, and flash interface 180 are connected to each other through a CPU bus.

CPU 110 controls operations of SSD controller 100. SSD controller 100 comprises at least one CPU 110. Where SSD controller 100 includes only one CPU 110, it is referred to as a "single-core processor" and where it includes multiple CPUs 110, it is referred to as a "multi-core processor". Collectively, CPU 110, internal memory 120, and buffer memory control unit 130 constitute a control logic unit. The control logic unit can be implemented in a single chip using a system on chip (SoC) technology. The single chip configuration may further incorporate I/O scheduling device 50 and flash interface 180.

A control algorithm executed by the SSD controller 100 can be stored in SSD controller 100 in the form of firmware, software or hardware. CPU 110, internal memory 120, buffer memory control unit 130, I/O scheduling device 50, and flash interface 180 may operate due to the control algorithm stored or installed in SSD controller 100. The control algorithm can be stored in a code region of internal memory 120, and additional information (e.g., mapping information) processed by the control algorithm may be stored in a data region of internal memory 120. Internal memory 120 can be provided inside or outside CPU 110.

In some embodiment, the control algorithm executed by SSD controller 100 is installed in SSD controller 100 in the form of firmware or software. However, components of the control algorithm can be configured in the form of firmware, software, or hardware.

I/O scheduling device 50 exchanges commands, addresses, and data with host 10 under the control of CPU 110. I/O scheduling device 50 can support any of various interfaces protocols, such as universal serial bus (USB), multi media card (MMC), PCIExpress (PIC-E), AT attachment (ATA), serial AT attachment (SATA), parallel AT attachment (PATA), small computer system interface (SCSI), serial attached SCSI (SAS), Enhanced Small Disk Interface (ESDI), and integrated drive electronics (IDE).

Buffer memory control unit 130 controls access operations (e.g., read/write/erase operations) of internal memory 120 and buffer memory 200 under the control of CPU 110. Flash interface 180 transmits and receives data between the internal memory 120 and/or buffer memory 200 and storage 300 and between internal memory 120 and buffer memory 200.

Where a read command is input from host 10, read data read from storage 300 is temporarily stored in buffer memory 200 through flash interface 180 and buffer memory control unit 130. The read data temporarily stored in buffer memory 200 is output to an external destination (or host 10) through buffer memory control unit 130 and I/O scheduling device 50.

Figure 8:
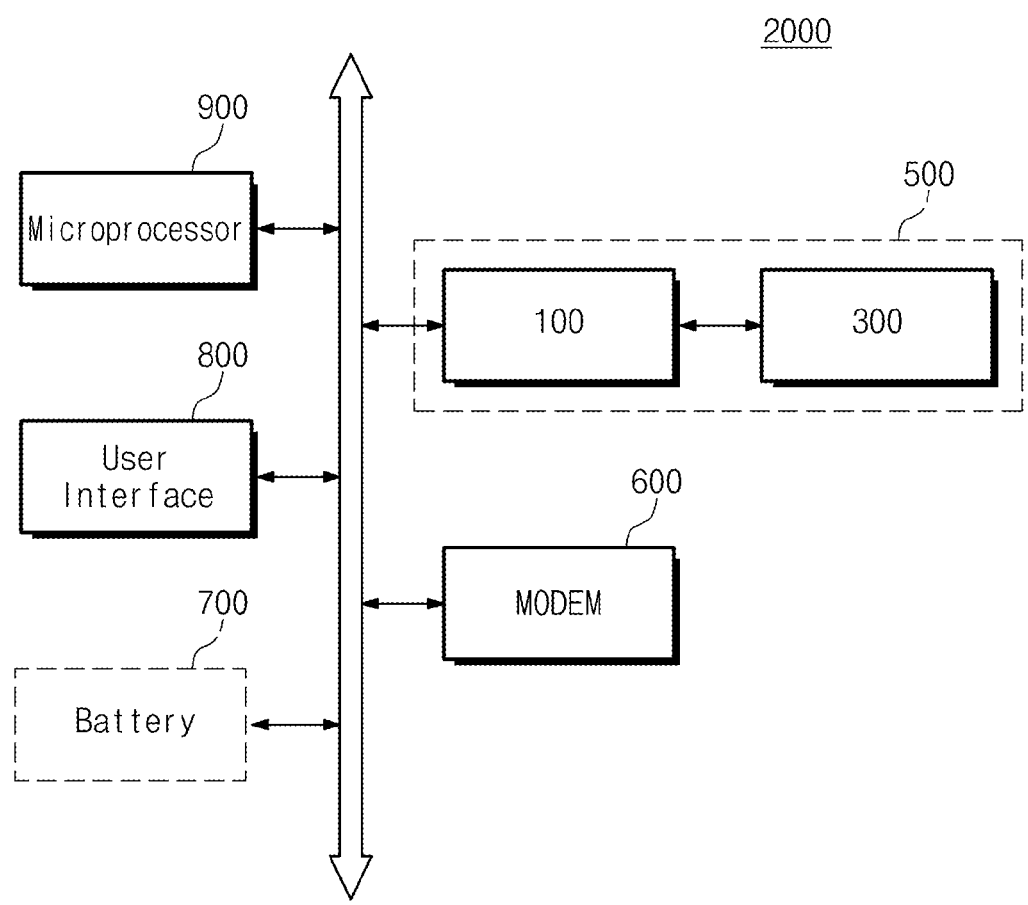
FIG. 8 is a block diagram of another system incorporating an I/O scheduling device according to an embodiment of the inventive concept.

FIG. 8 is a block diagram of another system incorporating an I/O scheduling device according to an embodiment of the inventive concept.

Referring to FIG. 8, a computing system 200 comprises a microprocessor 900, a user interface 800, a modem 600 functioning as a baseband chipset or a baseband SoC, and storage device 500 comprising controller 100 and storage 300.

Controller 100 comprises I/O scheduling device 50 of FIG. 2. A scheduler 58 in I/O scheduler device 50 is configured as shown in FIG. 3 to perform a scheduling operation according to the operations illustrated in FIG. 5. Accordingly, even where a plurality of microprocessors 900 are provided or a plurality of control units are provided in microprocessor 900, a multi-tasking operation may be efficiently scheduled without degradation in performance.

Where computing system 2000 is a mobile device, a battery 700 may be additionally provided to supply an operating voltage. Although not illustrated in the drawing, an application chipset, a camera image processor (CIS), a mobile DRAM, etc. can be further provided in computing system 2000. Controller 100 and storage 300 may constitute, for example, an SSD that uses a nonvolatile memory to store data.

Storage 300 can be used to store various types of data such as text, graphics, and software code. Storage 300 can comprise, for example, a NAND flash memory, a NOR flash memory, a PRAM, a ferroelectric RAM (FeRAM), and an MRAM. However, storage 300 is not limited to these types of memory.

In some embodiments, where controller 100 comprises a compression block, the compression block may include one of algorithms such as LZ77&LZ78, LZW, Entropy encoding, Huffman coding, Adaptive Huffman coding, Arithmetic coding, DEFLATE, and JPEG or various combinations thereof.

In some embodiments, an interface of controller 100 implements one of various computer bus standards, storage bus standards, iFCPPeripheral bus standards or combinations thereof. The computer bus standards may include, for example, S-100 bus, Mbus, Smbus, Q-Bus, ISA, Zorro II, Zorro III, CAMAC, FASTBUS, LPC, EISA, VME, VXI, NuBus, TURBOchannel, MCA, Sbus, VLB, PCI, PXI, HP GSC bus, CoreConnect, InfiniBand, UPA, PCI-X, AGP, PCIe, Intel QuickPath Interconnect, and HyperTransport. The storage bus standards may include, for example, ST-506, ESDI, SMD, Parallel ATA, DMA, SSA, HIPPI, USB MSC, FireWire (1394), Serial ATA, eSATA, SCSI, Parallel SCSI, Serial Attached SCSI, Fibre Channel, iSCSI, SAS, RapidIO, and FCIP. The iFCPPeripheral bus standards may include, for example, Apple Desktop Bus, HIL, MIDI, Multibus, RS-232, DMX512-A, EIA/RS-422, IEEE-1284, UNI/O, 1-Wire, I2C, SPI, EIA/RS-485, USB, Camera Link, External PCIe, Light Peak, and Multidrop Bus.

In some embodiments, I/O scheduling suitable to a storage device supporting multi-host environment is smoothly provided to improve operation performance of the storage device when the multi-host environment is supported.

While the inventive concept has been particularly shown and described with reference to embodiments thereof, it will be apparent to those of ordinary skill in the art that various changes in form and detail may be made therein without departing from the scope of the inventive concept as defined by the following claims.

What is claimed is:

1. An input/output (I/O) scheduling device, comprising:
    a plurality of trans-descriptor operators each corresponding to one of a plurality of hosts and configured to sustain a trans-descriptor and transmit the trans-descriptor to a hardware module;
    a transmitting scheduler configured to schedule transmission of trans-descriptors through communication with the plurality of trans-descriptor operators; and
    a receiving scheduler configured to schedule reception of trans-descriptors through communication with the trans-descriptor operators,
    wherein the transmitting scheduler and the receiving scheduler are configured to operate in parallel such that while the transmitting scheduler communicates with one of the plurality of trans-descriptor operators, the receiving scheduler concurrently communicates with another one of the trans-descriptor operators.

2. The I/O scheduling device of claim 1, wherein each of the trans-descriptor operators comprises:
    a sustainer connected to the transmitting scheduler and configured to sustain a trans-descriptor; and
    a dispatcher connected to the transmitting scheduler and configured to transmit the sustained trans-descriptor.

3. The I/O scheduling device of claim 1, wherein each of the trans-descriptor operators comprises:
    a sustainer connected to the receiving scheduler and configured to sustain a trans-descriptor; and
    a dispatcher connected to the receiving scheduler and configured to transmit the sustained trans-descriptor.

4. The I/O scheduling device of claim 1, further comprising:
    a transmission dispatching cache configured to temporarily store a trans-descriptor between each trans-descriptor operator and the transmitting scheduler.

5. The I/O scheduling device of claim 1, further comprising:
    a reception dispatching cache configured to temporarily store a trans-descriptor between each trans-descriptor operator and the receiving scheduler.

6. The I/O scheduling device of claim 1, wherein the transmitting scheduler schedules activated hosts in a round-robin fashion when scheduling transmission of transdescriptors.

7. The I/O scheduling device of claim 1, wherein the receiving scheduler schedules activated hosts in a round-robin fashion when scheduling reception of trans-descriptors.

8. The I/O scheduling device of claim 1, which is mounted in a controller of a solid state drive (SSD) to perform multi-host I/O scheduling.

9. An input/output (I/O) scheduling method for a storage device in a multi-host environment, comprising:
    defining a plurality of trans-descriptor operators according to a number of hosts connected to the storage device, each of the trans-descriptor operators configured to sustain a trans-descriptor and transmit the trans-descriptor to a hardware module;
    scheduling transmission of a trans-descriptor through communication between a transmitting scheduler and a trans-descriptor operator corresponding to a host generating a transmitting command; and
    scheduling reception of a trans-descriptor through communication between a receiving scheduler and a trans-descriptor operator corresponding to another host generating a receiving command,
    wherein the scheduling of transmission and the scheduling of reception are performed in parallel such that while the transmitting scheduler communicates with one of the plurality of trans-descriptor operators, the receiving scheduler concurrently communicates with another one of the trans-descriptor operators.

10. The I/O scheduling method of claim 9, wherein scheduling the transmission comprises:
   connecting a trans-descriptor to a last transmitting trans-descriptor pointer;
   patching a trans-descriptor of a next transmitting trans-descriptor pointer;
   caching the patched trans-descriptor; and
   transmitting the cached trans-descriptor to a corresponding hardware module according to a set condition.

11. The I/O scheduling method of claim 10, wherein the set condition is round-robin scheduling.

12. The I/O scheduling method of claim 10, wherein the set condition is priority scheduling based on transmission demands of each host.

13. The I/O scheduling method of claim 9, wherein scheduling the reception comprises:
   connecting a trans-descriptor to a last receiving trans-descriptor pointer;
   connecting a trans-descriptor to a next receiving trans-descriptor pointer;
   patching a trans-descriptor of the next receiving trans-descriptor pointer;
   caching the patched trans-descriptor; and
   transmitting the cached trans-descriptor to a corresponding hardware module.

14. The I/O scheduling method of claim 10, wherein the trans-descriptor is stored in a volatile memory and is generated by firmware.

15. A system, comprising:
   a storage device comprising one or more memory devices;
   a plurality of hosts configured to store data in the storage device; and
   an input/output (I/O) scheduling device configured to schedule transfer of trans-descriptors between the storage device and the plurality of hosts, wherein the I/O scheduling device comprises a transmitting scheduler and a receiving scheduler configured to operate in parallel such that while the transmitting scheduler communicates with a first trans-descriptor operator corresponding to one of the plurality of hosts to a transmit a first trans-descriptor from the first trans-descriptor operator, the receiving scheduler concurrently communicates with a second trans-descriptor operator corresponding to another one of the plurality of hosts to transmit a first trans-descriptor in to the second trans-descriptor operator.

16. The system of claim 15, wherein the I/O scheduling device is located within a scheduler of the storage device.

17. The system of claim 15, further comprising a link unit configured to manage communication between the storage device and the plurality of hosts.

18. The system of claim 15, wherein the storage device comprises a plurality of flash memory devices.

19. The system of claim 15, wherein the storage device is a solid state drive.

* * * * *